United States Patent [19]

Tokudome et al.

[11] 4,103,253
[45] Jul. 25, 1978

[54] METAL VAPOR LASER GENERATING APPARATUS

[75] Inventors: Kathumi Tokudome, Hidaka; Michio Ishikawa, Kawagoe; Noboru Kamide, Tokyo, all of Japan

[73] Assignee: The Kimmon Electric Co., Ltd., Tokyo, Japan

[21] Appl. No.: 738,521

[22] Filed: Nov. 3, 1976

[30] Foreign Application Priority Data

Dec. 24, 1975 [JP] Japan .................................. 50-153430

[51] Int. Cl.² ................................................ H01S 3/03
[52] U.S. Cl. ................................................. 331/94.5 G
[58] Field of Search .................................... 331/94.5 G

[56] References Cited

U.S. PATENT DOCUMENTS

| | | | |
|---|---|---|---|
| 3,720,877 | 3/1973 | Zarowin | 331/94.5 G |
| 3,742,378 | 6/1973 | Timmermans | 331/94.5 G |
| 3,899,750 | 8/1975 | Hochuli | 331/94.5 G |
| 4,031,484 | 6/1977 | Freiberg et al. | 331/94.5 G |

*Primary Examiner*—William L. Sikes
*Assistant Examiner*—Marcus S. Rasco
*Attorney, Agent, or Firm*—Flynn & Frishauf

[57] ABSTRACT

A metal vapor laser generating apparatus comprising a laser fine tube having Brewster windows at the ends and containing rare gas, an anode provided near one end of the fine tube, a vessel housing metal which is to be forwarded into the fine tube as vapor and ionized there by discharge, and a branch tube having its one end connected to the fine tube at a point adjacent to the other end of the fine tube. A cathode is provided at the other end of the branch tube and a large number of fine slits are bored through the wall of the branch tube at the central portion thereof, the slitted portion being surrounded by a sealed outer tube loaded with an adsorbent for adsorbing the ionized metal. The size of the slit is adjusted to permit passage of the ionized metal, but not to cause a discharge leakage.

15 Claims, 3 Drawing Figures

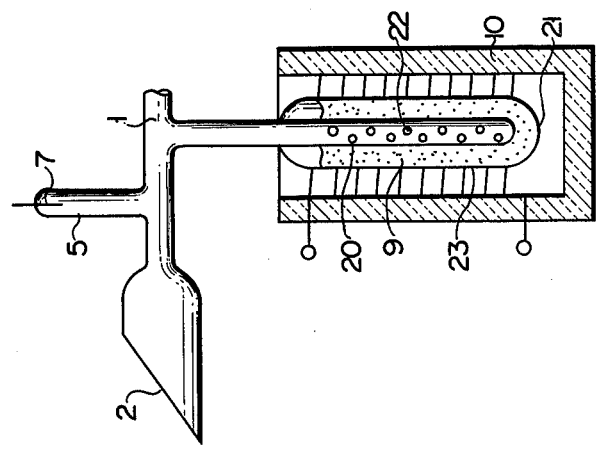
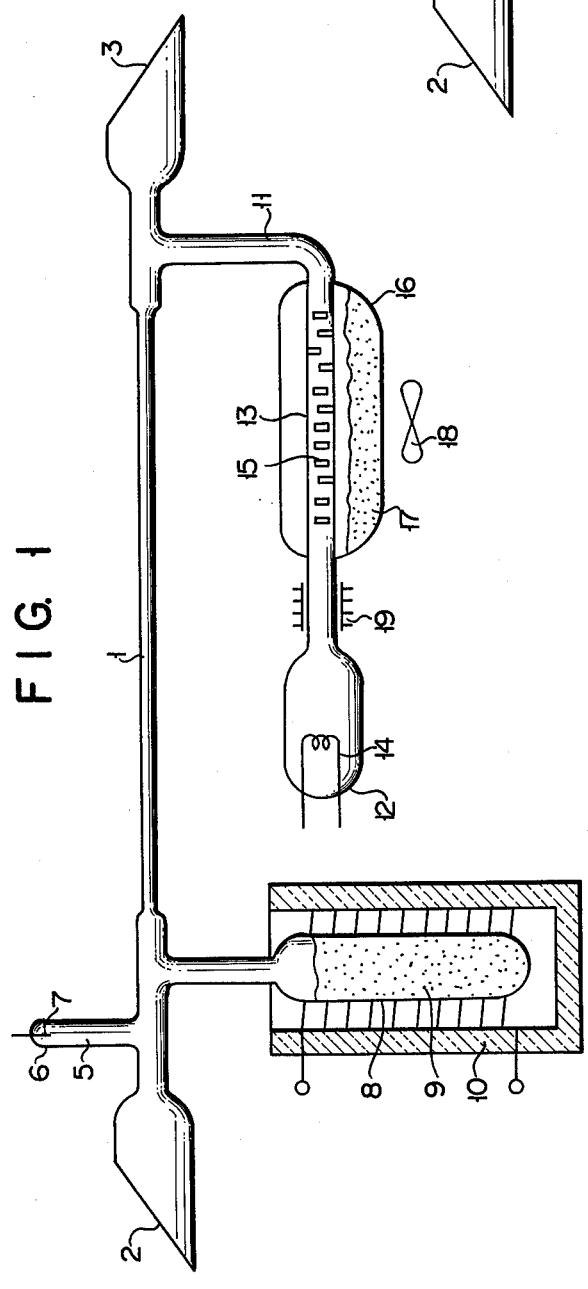
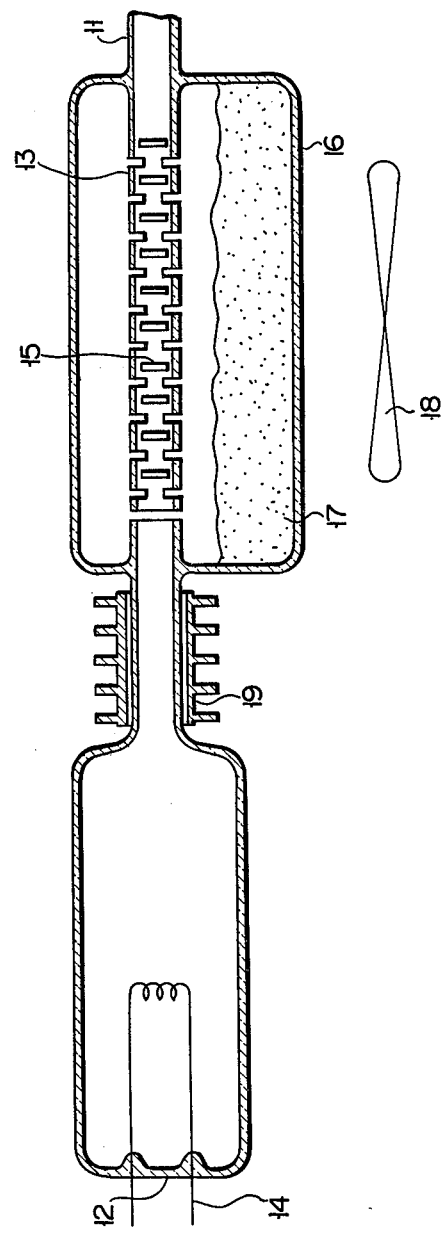

METAL VAPOR LASER GENERATING APPARATUS

BACKGROUND OF THE INVENTION (1) Field of the Invention

This invention relates to a metal vapor laser generating apparatus utilizing a cataphoresis effect, and more particularly, to a laser generating apparatus of a long life and high efficiency.

(2) Description of the Prior Art

In a prior art metal vapor laser generating apparatus utilizing a cataphoresis effect, a branch tube housing a metal is disposed adjacent to the anode of a discharge tube housing rare gas. The metal is evaporated by heating and, then, injected into a positive column forced in the discharge tube. The evaporated metal introduced into the positive column is ionized and flows toward the cathode, thereby forming a stream of ionized metal within the positive column.

In order to form a uniform stream of ionized metal within the discharge tube by cataphoresis effect, it is necessary to keep the metal vapor pressure on the side of the cathode lower than that on the side of the anode. To this end, some of the prior apparatus are equipped with a branch tube housing an adsorbent, which is disposed near the cathode, so as to allow the adsorbent to trap the ionized metal. In an apparatus of this construction, however, only a small portion of the ionized metal flows into the branch tube; a majority of the ionized metal flows to reach and sputter the cathode, resulting in a shortened life of the laser tube. An additional problem inherent in the prior apparatus is that the evaporated metal, when not trapped by the adsorbent, is accumulated around the cathode and absorbs light, leading to a decreased laser oscillation efficiency.

SUMMARY OF THE INVENTION

An object of this invention is to provide a metal vapor laser generating apparatus of a long life and high laser oscillation efficiency.

Another object is to provide a metal vapor laser generating apparatus capable of keeping the ionized metal concentration on the cathode side lower than that on the anode side.

The above objects and additional objects which will be seen from the detailed description which follows are achieved by a metal vapor laser generating apparatus comprising:

a laser fine tube including a peripheral side wall having first and second ends and containing rare gas;

Brewster windows provided at the first and second ends of said fine tube, respectively;

a first branch tube having an open end connected near but spaced from the first end of said fine tube to the peripheral side wall of said fine tube and a sealed end through which is inserted an anode;

a second branch tube including a peripheral side wall having an open end connected near but spaced from the second end of said fine tube to the peripheral side wall of said fine tube and a sealed end through which is inserted a cathode for effecting discharge with said anode;

a sealed vessel housing metal and connected to the peripheral side wall of said fine tube near said connection of said first branch tube to the peripheral side wall of said fine tube, said metal being evaporated by heating and introduced into said fine tube so as to be ionized by said discharge and provide an active medium for laser;

fine apertures provided in the peripheral side wall of said second branch tube at a central portion thereof and having a size such that the evaporated metal passes through the apertures, but the leakage of the discharge is not caused; and a sealed outer tube surrounding the apertured portion of said second branch tube and housing an adsorbent for adsorbing the evaporated metal passing through said apertures into said sealed outer tube.

This invention is based on the following aspects:

(1) A majority of the evaporated metal flows inside the discharge tube as ion.

(2) Where the ion is brought back into the original metal form by recombination with an electron on the wall of the discharge tube and completely adsorbed on the tube wall or completely flows outside through the tube wall, before the ion stream reaches cathode, the ion concentration inside the discharge decreases toward the cathode in accordance with an equation:

$$\exp(-p_{01}Z/a) \qquad (1)$$

where, $a$ is the radius of the discharge tube, $z$ is the distance along the discharge tube, and $p_{01}$ is the initial zero point of 0(zero) order Bessel function.

(3) Where the ion brought back into the original metal form by recombination on the tube wall does not all flow outside through the tube wall, equation (1) is changed to $$\exp(-\eta p_{01}Z/a) \qquad (2)$$

Where $\eta$ is the parameter which is a function of the ease with which the metal vapor flows outside through the tube wall.

With the above taken into account, the wall of the discharge tube according to this invention is enabled to permit passage of the metal vapor. Specifically, the wall of the discharge tube near the cathode is provided with a number of fine apertures through which the metal vapor flows outside. In this case, the size of each aperture is adjusted not to disturb the discharge (or not to cause leakage of the discharge).

BRIEF DESCRIPTION OF THE DRAWING

FIG. 1 is a schematic view illustrating a metal vapor laser generating apparatus according to one embodiment of this invention;

FIG. 2 is a cross sectional view showing a part of a metal vapor laser generating apparatus according to this invention; and FIG. 3 is a schematic view illustrating another part of a metal vapor laser generating apparatus according to this invention.

DETAILED DESCRIPTION OF THE PREFERRED EMBODIMENTS

This invention will now be described with reference to the accompanying drawings.

As shown in FIG. 1, a metal vapor laser generating apparatus according to this invention includes a laser fine tube 1 having Brewster windows 2 and 3 at the ends. Rare gas like, for example, helium is sealed inside the fine tube 1, the pressure of the sealed gas being as low as, for example, about 3 tor. A first branch tube 5 is connected to the fine tube 1 near but spaced from one end of the fine tube 1 to communicate with said tube 1. The branch tube 5 has a sealed end 6 through which is inserted an anode 7.

It is seen that a sealed vessel 8 housing metal 9 is provided to communicate with the fine tube 1 at a position near the connection of the branch tube 5 to the fine tube 1. A heating means like, for example, an electric furnace 10 is provided around the sealed vessel 8.

Adjacent to but spaced from the other end of the fine tube 1 is provided a relatively long L-shaped second branch tube 11 having a sealed end 12 through which is inserted a cathode 14. The second branch tube 11 communicates with the fine tube 1 and is, for example, 1 mm in wall thickness and 13 mm in diameter. As described later in detail, the wall of the branch tube 11 is bored to provide a number of fine apertures 15 at the central portion 13 of the branch tube 11. The size of each aperture 15 is adjusted to permit passage of the evaporated metal but not to cause leakage of the discharge.

FIG. 2 shows a part of the L-shaped branch tube 11 in which each aperture 15 is constructed by a fine slit. The slits 15 are each arranged to extend in a direction perpendicular to the length of the branch tube 11. The width of each slit 15 is equal to or smaller than the wall thickness of the branch tube 11. Where the slitted portion 13 of the branch tube 11 is, for example, 120 mm long, the ratio of the wall area of the slitted portion 13 to the sum of the areas of the slits 15 is, for example, 4:1.

A sealed outer tube 16 loaded with an adsorbent 17 such as synthetic zeolite is provided to cover the entire slitted portion 13 of the branch tube 11. The evaporated metal passed through the slits 15 into the sealed outer tube 16 is adsorbed on the adsorbent 17. Below the outer tube 16 is disposed a cooling means such as a cooling fan 18 for cooling the adsorbent 17. Also disposed between the outer tube 16 and the sealed end 12 of the branch tube 11 is a fin-shaped radiator 19 which encloses a part of the branch tube 11.

As described previously, each fine aperture or slit 15 has such a size that the evaporated metal passes through it, but leakage or disturbance of discharge is not caused by it. incidentally it would be possible to those skilled in the art to determine experimentally the optimum size of the slit from the internal pressure and wall thickness of the branch tube 11, etc. in view of Paschen's law.

In operation, a predetermined level of D.C. voltage is applied across the anode 7 and the cathode 14 so as to cause discharge inside the laser fine tube 1 and ionize the rare gas housed in the tube 1. By this ionization, a so-called "positive column" is formed, in which the number of liberated electrons is in equilibrium with the number of positive ions formed. When the positive column has been formed, the metal 9 housed in the sealed vessel 8 is heated by the electric furnace 10 and evaporated. The evaporated metal enters the laser fine tube 1 and is ionized. In this case, the ionized metal is caused to flow toward the cathode in a uniform stream by cataphoresis effect. The ionized metal is excited within the fine tube 1 into a higher energy level so as to provide an active medium for a laser.

The metal ions flowing toward the cathode 14 are brought back into the original metal by recombination with electrons on the wall of the branch tube 11 and part of them enters the outer tube 16 by diffusion through the fine slits 15 so as to be adsorbed on the adsorbent 17 housed in the outer tube 16. The cooling fan 18 serves to cool the adsorbent 17; otherwise, the adsorbent 17 is heated by conduction, resulting in a decreased adsorbability of the adsorbent 17.

The rare gas sealed in the laser fine tube 1 is preferably helium, but neon, argon, etc. may also be used with acceptable results.

In order to determine the kind of metal housed in the sealed vessel 8, it is necessary to consider the vapor pressure of the metal suitable for obtaining a satisfactory laser gain, which generally ranges from $2 \times 10^{-3}$ tor to $2 \times 10^{-2}$ tor.

For instance, those metals such as cadmium, selenium, zinc, etc. having a saturated vapor pressure lower than the above-noted vapor pressure at which is obtained a satisfactory laser gain at a temperature reached by the discharge, generally from about 50° to about 70° C can be readily increased in their vapor pressure to the level mentioned. Thus, such metals can be loaded in the sealed vessel 8 as they are. However, when those metals such as iodine, posphorus, mercury, etc. having a saturated vapor pressure exceeding $2 \times 10^{-3}$ to $2 \times 10^{-2}$ tor. at about 50° to about 70° C, it is preferred to have such metals adsorbed on an adsorbent like synthetic zeolite and heat the metals adsorbed on an adsorbent to a readily controllable temperature of 100° to 150° C. Thus, even such metals can have their vapor pressures reach to a vapor pressure suitable for obtaining a satisfactory laser gain.

It is most preferred to load Molecular Sieves (trade name of synthetis zeolite available from Lindo Co. of U.S.A.) as an adsorbent in the sealed vessel 8 and in the sealed outer tube 16 surrounding the slitted portion 13 of the branch tube 11. Where mercury is used for providing the metal vapor, it is possible to load in the sealed vessel 8 and sealed outer tube 16 a substance capable of forming an amalgam with mercury like, for example, thallium. Where cadmium is used for providing the metal vapor, the vessel wall itself acts as the adsorbent in some cases.

As described above, it is sometimes necessary to load a metal adsorbed on an adsorbent in the sealed vessel 8. In this case, the ratio of the metal to the adsorbent depends naturally on the kinds of particular metal and adsorbent used. But, the ratio can be readily determined experimentally based on an adsorption equation in view of the fact that the metal vapor pressure at 100° to 150° C should be $2 \times 10^{-3}$ tor to $2 \times 10^{-2}$ tor. For example, where iodine is adsorbed on synthetic zeolite such as Molecular Sieves, a preferred amount of iodine ranges from 1 to 5 parts by weight per 100 parts by weight of Molecular Sieves.

The laser generating apparatus described comprises the branch tube 11 having, for example, 13 mm of diameter and the slitted portion 13 having a length of, for example, 120 mm. Since "$p_{01}$" and "$\eta$" in equation (2) mentioned earlier, i.e., $\exp(-\eta p_{01} Z/a)$, are 2.4 and 0.2, respectively, the ratio of iodine concentration at the outlet, namely the end facing the cathode, of the slitted portion 13 of the branch tube 11 to that at the inlet becomes $1.4 \times 10^{-4}$. Incidentally, "Z" for the above formula is 120 mm and "$a$" denotes the radius of the tube (in this case, $2a = 13$ mm). Actually the spectrum of iodine was not observed at the outlet of the slitted portion in question.

It is seen that the sealed vessel 8 of FIG. 1 is of a single wall construction. In contrast, the sealed vessel shown in FIG. 3 is of a double wall construction. Specifically, a tube 20 having a sealed end 21 is surrounded by a sealed outer tube 23. The tube 20 has a diameter equal to that of the fine tube 1 and is provided with a large number of small holes 22. The metal unsupported or supported by an adsorbent is loaded between the walls of the tubes 20 and 23. In this case, the size of each hole 22 bored through the wall of the tube 20 is adjusted to permit passing of the metal vapor but not to permit a metal lump or an adsorbent lump to pass therethrough. A vessel of this construction is advantageous in that the metal or the adsorbent housed therein does not enter the laser fine tube 1 during transportation of the laser generating apparatus. Accordingly, the Brewster windows 2 and 3 are not contaminated by evaporation of the metal or the adsorbent during operation.

What we claim is:

1. A metal vapor laser generating apparatus comprising:
   a laser fine tube including a peripheral side wall having first and second ends and containing rare gas;
   Brewster windows provided at said first and second ends of said fine tube, respectively;
   a first branch tube having an open end connected near but spaced from the first end of said fine tube to the peripheral side wall of said fine tube, and a sealed end through which is inserted an anode;
   a second branch tube including a peripheral side wall having an open end connected near but spaced from the second end of said fine tube to the peripheral side wall of said fine tube, and a sealed end through which is inserted a cathode for effecting discharge with said anode;
   a sealed vessel housing metal and connected to the peripheral side wall of said fine tube near said connection of said first branch tube to the peripheral side wall of said fine tube, said metal being evaporated by heating and being introduced into said fine tube so as to be ionized by said discharge and provide an active medium for laser;
   a plurality of fine apertures provided over a given length of the peripheral side wall of said second branch tube at a central portion thereof between said sealed end thereof and said fine tube, said apertures having a size such that the evaporated metal passes through the apertures, but without causing leakage of the discharge current passing through said second branch tube and passing by said apertures, said apertures being provided over a length of said second branch tube which is greater than the inner diameter dimension of said second branch tube; and
   a sealed outer tube surrounding the apertured portion of said second branch tube and housing an adsorbent for adsorbing the evaporated metal passing through said apertures into said sealed outer tube.

2. The apparatus according to claim 1, wherein a heating means for heating the metal is provided surrounding said sealed vessel.

3. The apparatus according to claim 2, wherein a cooling means for cooling the adsorbent is provided below said sealed outer tube.

4. The apparatus according to claim 3, wherein said adsorbent is synthetic zeolite.

5. The apparatus according to claim 4, wherein the rare gas is helium and the metal is cadmium, selenium or zinc.

6. The apparatus according to claim 1, wherein the metal is supported by an adsorbent.

7. The apparatus according to claim 6, wherein a heating means for heating the metal is provided surrounding the sealed vessel.

8. The apparatus according to claim 7, wherein a cooling means for cooling the adsorbent is provided below the sealed outer tube.

9. The apparatus according to claim 8, wherein the adsorbent housed in said sealed outer tube and the adsorbent supporting the metal in said sealed vessel are each synthetic zeolite.

10. The apparatus according to claim 9, wherein the rare gas is helium and the metal is iodine, phosphorus or mercury.

11. A metal vapor laser generating apparatus comprising:
    a laser fine tube including a peripheral side wall having first and second ends and containing helium;
    Brewster windows provided at said first and second ends of the fine tube, respectively;
    a first branch tube having an open end connected near but spaced from the first end of said fine tube to the peripheral side wall of said fine tube, and a sealed end through which is inserted an anode;
    a second branch tube including a peripheral side wall, said second branch tube having an open end connected near but spaced from the second end of said fine tube to the peripheral side wall of said fine tube, and a sealed end through which is inserted a cathode for effecting discharge with said anode;
    a sealed vessel connected to the peripheral side wall of said fine tube near said connection of said first branch tube to the peripheral side wall of said fine tube and housing iodine adsorbed on synthetic zeolite in an amount of 1 to 5 parts by weight per 100 parts by weight of synthetic zeolite, said iodine being evaporated by heating and introduced into said fine tube so as to be ionized by said discharge and provide an active medium for laser;
    an electric heating mean surrounding said sealed vessel and heating said iodine to a temperature in the range of 100° to 150° C to release said iodine from said synthetic zeolite as the iodine vapor;
    a plurality of fine slits distributed over a given length of the peripheral side wall of said second branch tube at a central portion thereof between said sealed end thereof and said fine tube, each slit extending in a direction perpendicular to the length of said slitted portion of said second branch tube and having a width permitting passage of said iodine vapor but preventing leakage of the discharge current passing through said second branch tube and passing by said fine slits, said fine slits being distributed over a length of said second branch tube which is greater than the inner diameter dimension of said second branch tube;
    a sealed outer tube surrounding the slitted portion of said second branch tube and housing synthetic zeolite for adsorbing the iodine vapor passing through said slits into said outer tube; and
    a cooling fan cooling said synthetic zeolite in said sealed outer tube and disposed below said sealed outer tube.

12. Apparatus according to claim 11 wherein said sealed outer tube surrounding said slitted portion of said second branch tube is a single sealed tube.

13. Apparatus according to claim 11 wherein said second branch tube is L-shaped.

14. Apparatus according to claim 11 wherein said slits are rectangular in shape.

15. Apparatus according to claim 1 wherein said sealed outer tube surrounding said apertured portion of said second branch tube is a single sealed tube.

* * * * *